United States Patent [19]

Pugsley

[11] 4,037,249
[45] July 19, 1977

[54] REPRODUCTION OF COLORED IMAGES

[75] Inventor: Peter C. Pugsley, Pinner, England

[73] Assignee: Crosfield Electronics Limited, London, England

[21] Appl. No.: 641,378

[22] Filed: Dec. 16, 1975

[30] Foreign Application Priority Data

Dec. 18, 1974 United Kingdom ............... 54670/74

[51] Int. Cl.² .............................................. H04N 1/46
[52] U.S. Cl. ........................................ 358/76; 358/80
[58] Field of Search ................................... 358/76, 80

[56] References Cited

U.S. PATENT DOCUMENTS

| | | | |
|---|---|---|---|
| 2,434,561 | 1/1948 | Hardy et al. | 358/80 |
| 3,002,048 | 9/1961 | Bailey et al. | 358/76 |
| 3,098,895 | 7/1963 | Loughlin | 358/76 |
| 3,674,364 | 7/1972 | Korman | 358/76 |

*Primary Examiner*—John C. Martin
*Attorney, Agent, or Firm*—Kemon & Estabrook

[57] ABSTRACT

For the reproduction of colored originals, a set of standard color patches is scanned with an original to be reproduced and corresponding signals are applied to a display system having controls for adjusting the appearance of the displayed original and color patches. The standard color patch signals applied to the display are gated out and used to adjust a color-modifying means in the signal path between the input scanner and the output scanner, for reproducing the original, in such a manner that the standard color patches if reproduced by the output scanner would simulate the appearance of the displayed standard color patches after the adjustment of the display system.

7 Claims, 3 Drawing Figures

FIG. 1

REPRODUCTION OF COLORED IMAGES

This invention is concerned with the reproduction of coloured images by scanning techniques and has for its object to increase the extent to which an operator, responsible for adjusting parameter controls in the scanning system, is aware of the effect of these adjustments in the final print.

In our prior British specification No. 905,600, we disclose a method of making a reproduction of an original in which signals from the scanning system were applied to a signal-distorting circuit having a distortion characteristics corresponding to the reproduction process which was to be used; the signals from the distorting circuit were applied to a correction circuit having adjustable controls and thence to a display system. The operator adjusted the controls to modify the displayed image until a satisfactory result was obtained and then made the reproduction by subjecting scanner signals to the corrections representing by the controls on the above-mentioned correction circuit, the corrected signals being then used to make the reproduction of the image.

While the system described in this earlier specification gives generally satisfactory results, it lacks flexibility in at least two respects. The present invention and the manner in which it overcomes this lack of flexibility, will now be described.

A method of reproducing coloured originals according to the present invention includes scanning an original by means of an analysing scanner to obtain electric signals the values of which at any instant correspond to colour-component densities of a scanned element of the original and applying the resulting electric signals through a colour-modifying means to a reproducing scanner to make colour separations and further comprises: generating colour-component electric signals representing the effect of scanning a set of standard colour patches with the analysing scanner; as well as colour-component electric signals corresponding to a scanning of the original; applying the said colour component signals representing the colour patches and original to a display system having a known colour calibration through a display adjustment unit, by means of which an operator can adjust the signals as required and thereby adjust the coloured reproduction on the display system; sampling the adjusted display signals fed to the display system to obtain signal samples representing the displayed standard colour patches; and adjusting the colour-modifying means in accordance with the values of the colour-patch display sample signals in such a manner that the use of signals representing the effect of scanning the said standard colour patches, after their modification by the colour-modifying means, to control the reproducing scanner would result in colour separations leading to a reproduction of the standard colour patches which simulated the appearance of these patches in the adjusted colour reproduction on the display system; and thereafter applying signals, resulting from scanning the original, through the adjusted colour-modifying means to the reproducing scanner to make colour separations from the original.

Thus, in a method according to the present invention, standard colour patches are scanned and instead of the control settings being transferred from the display system circuit to the correction circuit, data representing the appearance of the colour patches on the display system is transferred. With the apparatus proposed in our earlier specification, because the control settings were being transferred from a viewing circuit to an output scanner circuit, the characteristics of these circuits had to be the same. Thus the scanner and the viewer had to be designed together, whilst with the method and apparatus according to the present invention the viewer can be designed without knowledge of the scanner characteristics and can be used with any scanner. In addition, if scanner circuits and viewer circuits are designed to have the same characteristics, there is a loss in flexibility of design. In the earlier system, both circuits had to be equally accurate and stable. However, for the viewing circuit in the system of the present invention, the accuracy and stability is not of prime importance but the circuit must operate with a full video bandwidth. For the scanner circuit accuracy and stability is very important but the bandwidth requirement is less. In the earlier circuit, the necessity for designing both circuits for the same accuracy, stability and bandwidth inevitably led to less than optimum design for each one of the circuits.

Preferably, the colour modifying means forms part of a computer which is programmed in an iterative manner to adjust itself in accordance with the values of the colourpatch display sample signals.

In order that the invention may be better understood, two examples of apparatus for carrying out the invention will now be described with reference to the accompanying drawings, in which.

Figure 1:
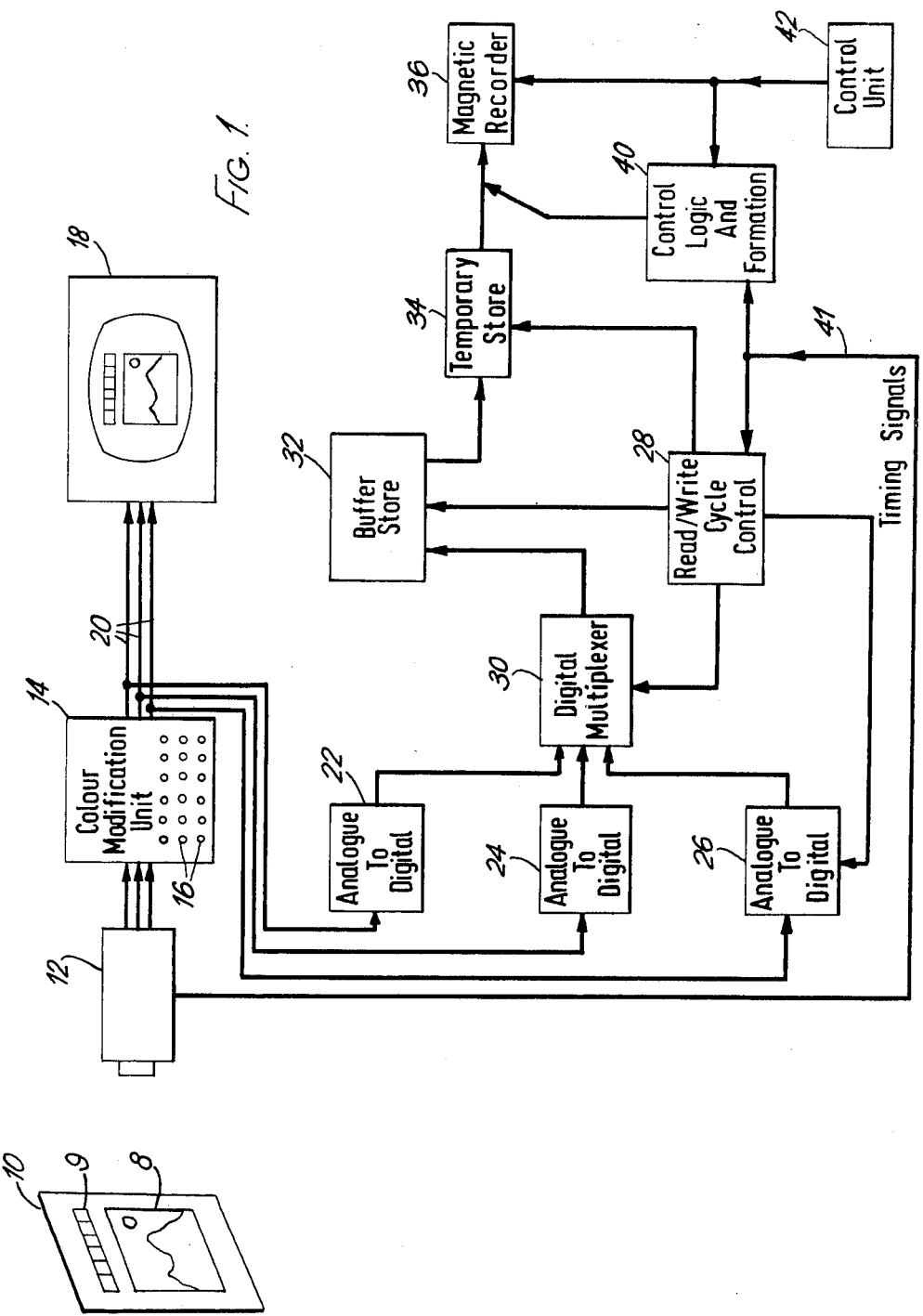
FIG. 1 shows diagrammatically apparatus for providing signals representing the appearance of colour patches on a display system.
Figure 2:
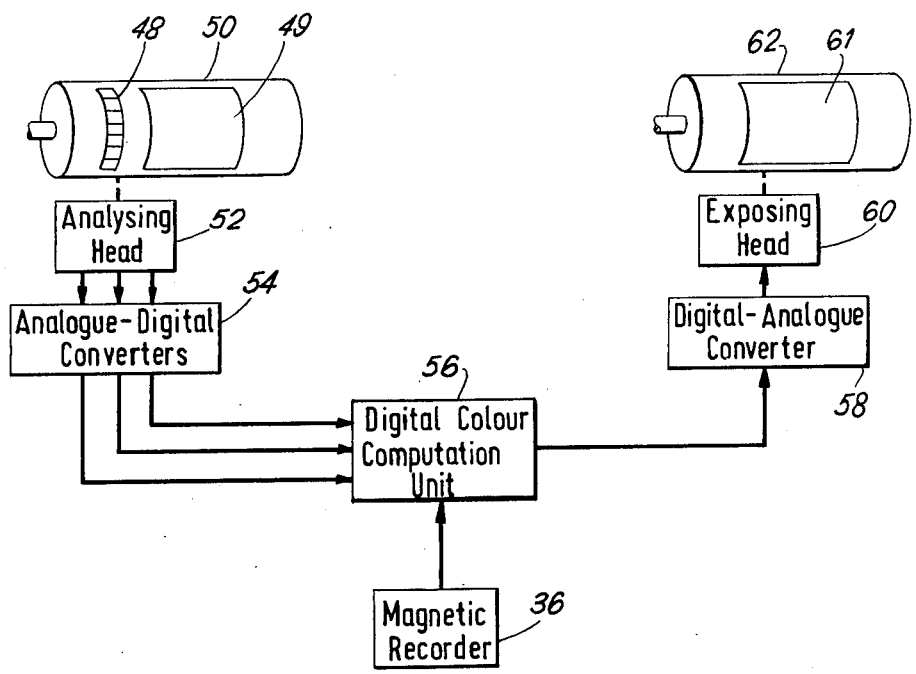
FIG. 2 illustrates apparatus for controlling the reproducing scanner with signals derived by means of the apparatus of FIG. 1.

Broadly speaking, the apparatus of FIGS. 1 and 2 operates in the following manner. In FIG. 1, the color signals derived from the transparency and color patches are conveyed with a first transfer function to the input of the color modification unit 14. The operator adjusts the controls of the unit 14 to transfer signals from the input of that unit to the display unit, the display corresponding to the input signals to the unit 14 modified by a second transfer function introduced by the operator. Thus both the displayed transparency signals and the displayed color patch signals are now representative of the original colors modified by the combination of the first and second transfer functions. The colors patch signals, thus modified, are strobed out of the main signals and are recorded by the recorder 36. In FIG. 2, the input scanner supplies to digital color computation unit 56 a set of signals representing the color patches and transparency with a third transfer function. The unit 56 introduces a fourth transfer function under the control of the magnetic 36, this fourth transfer function being adjusted in an iterative manner until the resulting color patch signals are the same as those sampled in FIG. 1. When this is achieved for the color patch signals, the combination of the third and fourth transfer function is the same as the combination of the first and second transfer function. Consequently, the transparency signals derived from the unit 56 are also the same as those controlling the display in FIG. 1.

In FIG. 1, a transparency 8 to be reproduced and standard colour patches 9 are held in a support 10 and are scanned by a television camera 12, the three colour signals from which are applied to a colour modification unit 14 having controls 16 for arbitrary modification of picture rendering. The unit 14 may, for example, contain circuits and apparatus well known in the colour television field for handling and processing colour video signals representing red, green and blue colour components. Alternatively, the unit 14 may contain circuits well known in the field of colour scanner design; thus the unit 14 may contain a single-colour selector system based on the system disclosed in British Pat. No. 1,241,852 modified along well-known lines to be capable of operation at video bandwidth. The cost and complexity of this modification is considerably reduced because the unit 14 provides only display signals and therefore can be constructed with less attention to stability and accuracy. As the circuits described in this prior specification are designed to operate on signals in logarithmic form, they would be preceded by logarithmic circuits and followed by antilogarithmic circuits.

The modified colour component signals are applied over colour channels 20 to an output viewer 18 which may be a colour television monitor. The operator adjusts the controls 16 until the reproduction of the transparency on the output device is as required, i.e. represents the desired reproduction of the picture.

The red-channel, green-channel and blue-channel video analogue signals derived from colour channels 20 are also applied to analogue-to-digital converters 22, 24 and 26 which may, for example, provide 8-bit outputs. A time base or clock signal from the camera 12 is applied to a read-write cycle control unit 28, which supplies a timing signal for the digital-to-analogue converters 22, 24 and 26. These timing signals control the application of the digital signals from these converters to a time division digital multiplexer 30 in such a manner that the digital signals corresponding to the standard color patches are strobed out and passed into a buffer store 32, which may for example be a core store with a capacity of 4K × 8 bits. Again under the control of the cycle control 28, digital data is read from the buffer store 32 and is passed through a temporary store 34 to an output device 36 which in this case is a magnetic recorder of the cassette-loading type. The store 34 is a fast buffer register of small capacity.

Control logic for the cassette recorder and data formatting is provided by a circuit 40 which is controlled over line 41 by the timing signals from the scanner and by signals from a control unit 42. The unit 42 receives signals for sensing the position of the tape during motion and provides signals for positioning the cassette tape and for controlling the recording operation.

When the image is to be reproduced, an analysing scanner provided with permanent standard colour patches 48 (FIG. 2) arranged in line around the circumference of an analysing drum 50, is also provided with an analysing head 52 and is arranged so that the head 52 scans the colour patches in a setting-up operation prior to scanning the original 49. The scanning is carried out in a well-known manner by rotation of the drum accompanied by slow movement of the analysing head 52 parallel to the drum axis. The signals from the analysing head, corresponding to the red, green and blue colour components of the colour patches, are applied through analogue-digital converters 54 to a digital colour computation unit 56. This may comprise a digital computer in combination with a look-up table, as described in our British patent specification No. 1,369,702. For the purpose of reproducing the original, the digital colour computation unit 56 has its output connected through a digital-to-analogue converter 58 to an exposing head 60, which exposes a light sensitive surface 61 on an exposing drum 62.

In the preliminary operation, however, when the colour patches are scanned, the digital colour computation unit 56 is controlled by replay signals from the magnetic recorder 36, that is to say by the signals representing the desired appearance of the scanned standard colour patches if they were reproduced by means of colour separations produced on the exposing drum 62. The digital colour computation unit 56 is programmed in an iterative manner to ensure that it automatically sets its own parameters to achieve this result, i.e., to provide signals which would lead to reproductions of colour patches corresponding to the colour patches reproduced on the display system. When the parameters have been set in this manner, the original 49 is scanned in the usual way and the resulting signals, after modification by the digital colour computation unit 56, are applied to the exposing head 60, as described above, to expose the light-sensitive surface 61 to form a colour separation. Either each colour separation in turn can be exposed in this way, or if desired all colour separations can be mounted on a single drum and can be exposed in a single operation.

The colour transformations required to achieve the desired reproduction of the standard colour patches involve transforming the input red, green and blue signals from the display systen into CIE colour co-ordinates, for example using the known characteristics of the display tube. These co-ordinates are then transformed into ink percentages using an inverse Neugebauer transformation, to give a set of desired ink percentages for the standard colour patches. These percentages are compared with the percentages represented by the signals from the scanner to permit the parameter adjustments to be made.

The display system described in connection with FIG. 1 is entirely independent of the scanner of FIG. 2, except for details such as data formatting, i.e., the encoding of special data characters for a preamble and postlude for the recorded data signal trains to ensure correct recognition and recording of data by the output device. Such formatting circuits are well known in data transmission and form no part of the present invention. As a consequence, the display system can be used with scanners of different designs. The original 49 may be a transparency or may be a print viewed by reflected light.

Figure 3:
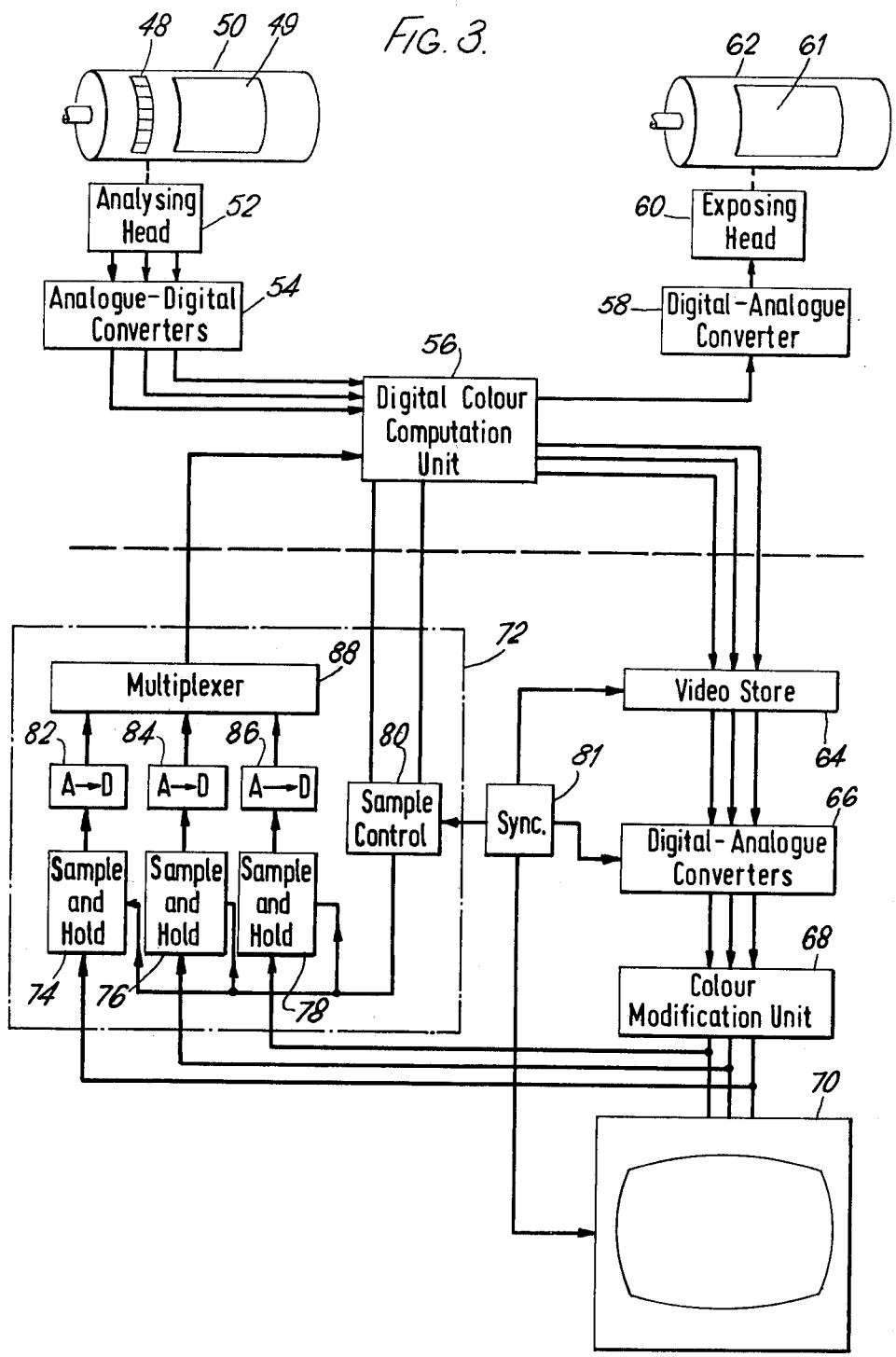
FIG. 3 illustrates diagrammatically an alternative to the apparatus of FIGS. 1 and 2, including a display system and a reproducing scanner.

In the apparatus shown in FIG. 3, no television camera is used. The units 50-62 are as described in connection with FIG. 2. For display purposes, the standard colour patches and original are scanned, possibly at reduced resolution, and the signals are modified in the digital colour computation unit 56 to give them display characteristics, i.e., characteristics compatible with the display system to follow. The resulting signals from the unit 56 are applied to a high speed viedo store 64 which may be of the solid-state or magnetic-disc kind. The store 64 is capable of storing one frame at the required display resolution. Signals from the store are applied through a digital-to-analogue converter unit 66 and a colour modification unit 68 to a display system 70, which may include a colour television monitor. The colour modification unit includes controls which are adjusted by an operator until the displayed image is satisfactory.

A sampling unit 72 is provided to extract from the output of the colour modification unit 68 signals representing the standard colour patches. To achieve this, the colour channel signals from the unit 48 are applied to sample-and-hold circuits 74, 76 and 78 in the sampling block 72. The circuits 74-78 are controlled in time by a sample control unit 80 which in turn is controlled by signals from the computer 56 and signals from a synchronising circuit 81. The computer 56 is programmed to provide signals representing the known position co-ordinates of the standard colour patches. The synchronising circuit 81 provides signals corresponding to the time base signals of the display system 70, i.e., signals representing the actual scanning position of the display beam. When the actual scanning position of the display beam coincides with the co-ordinate data provided by the computer, the sample control circuit 80 causes the circuits 74-78 to hold the signals which they are then receiving and to apply these signals to analogue-to-digital converters 82, 84 and 86. The digital signals from the circuits 82-86 are applied through a multiplexer 88 to the computer 56. The computer 56 is programmed to convert the colour patch signals to printed-ink values and to store them. The colour computer is then made ready for scanning and is operated according to an iterative programme during a preliminary scanning of the colour patches to cause it to optimise its own settings, i.e., to adjust them in such a manner that the reproduction of the standard colour patches would correspond with the stored printed-ink values derived from the colour display. Once the settings have been achieved, the original is scanned at full resolution. The signals representing the colour components of the original are applied to the digital colour computation unit which, operating in accordance with its optimised settings, supplies modified signals to the exposing scanner. The advantage of the apparatus shown in FIG. 3 over that shown in FIG. 1 is that it is more economical in that it eliminates the necessity for the input television camera or flying spot scanner.

In the above description, it has been assumed that the colour patches are scanned with the original to provide signals for the display system. However, if desired the colour patch signals could be generated without scanning a set of colour patches; for example, a signal generator could be set to provide digital signals having values representing each colour patch and these patch-representing signals could be applied directly to the digital colour computation unit 56 of FIG. 3 or even to the video store, the signals being timed so that they do not coincide with the arrival of the signals derived by scanning the original or gated so as to override such signals.

I Claim:

1. A method of reproducing coloured originals, in which an original is scanned by means of an analysing scanner to obtain electric signals the values of which at any instant correspond to colour-component densities of a scanned element of the original and in which the resulting electric signals are applied through a colour-modifying means to a reproducing scanner to make colour separations, the method further comprising the steps of:

generating colour-component electric signals representing the effect of scanning a set of standard colour patches with the analysing scanner, as well as colour-component electric signals corresponding to a scanning of the original;

applying the said colour component signals representing the colour patches and original to a display system having a known colour calibration through a display adjustment unit, by means of which an operator can adjust the signals as required and thereby adjust the coloured reproduction on the display system;

sampling the adjusted display signals fed to the display system to obtain signal samples representing the displayed standard colour patches;

adjusting the said colour-modifying means in accordance with the values of the colour-patch display sample signals in such a manner that the use of signals representing the effect of scanning the said standard colour patches, after their modification by the colour-modifying means, to control the reproducing scanner would result in colour separations leading to a reproduction of the standard colour patches which simulated the appearance of these patches in the adjusted colour reproduction on the display system;

and thereafter applying signals, resulting from scanning the original, through the adjusted colour-modifying means to the reproducing scanner to make colour separations from the original.

2. A method in accordance with claim 1, in which a set of standard colour patches is fixed permanently to a cylinder around which the original is wrapped for scanning by the analysing scanner.

3. A method in accordance with claim 1, in which the colour modifying means forms part of a computer which is programmed in an iterative manner to adjust itself in accordance with the values of the colour-patch display sample signals.

4. Apparatus for the reproduction of a coloured original, including an analysing scanner for deriving electric signals the values of which at any instant correspond to colour-component densities of the scanned element of the original, colour modifying means to which the signals from the analysing scanner are applied, and a reproducing scanner receiving the output of the colour modifying means, the apparatus further including:

means for generating colour-component signals representing the effect of scanning a set of standard colour patches;

a display system for providing a display of the original and standard colour patches in response to the said colour-component signals representing the original and the standard colour patches;

colour-adjusting means connected to permit adjustment of the colour component signals before their application to the display system;

means for sampling the adjusted colour-component signals in synchronism with their application to the display system to extract signals representing the appearance of the colour patch signals on the display system;

and means operating under the control of the said sample signals to adjust the colour-modifying means, through which the analysing scanner signals are applied to the exposing scanner, in such a manner that signals applied to the colour-modifying means and representing the effect of scanning the said standard colour patches would result in the production of colour separations which together gave colour patch reproductions having substantially the same appearance as the displayed colour patches.

5. Apparatus in accordance with claim 4, in which the means for generating the colour component signals representing the standard colour patches comprises a set of standard colour patches which is scanned at the same time as the original is scanned to provide the signals for display.

6. Apparatus according to claim 5, in which the original is mounted upon a cylinder for scanning by an analysing head in the analysing scanner and signals from the analysing head are applied to a video store capable of storing one scanning frame of the data from the analysing head and connected to apply the stored signals to the display system.

7. Apparatus in accordance with claim 6, in which the said set of standard colour patches is permanently mounted on the cylinder.

* * * * *